Sept. 25, 1934.  A. KOTTMANN  1,974,494
CALCULATING MACHINE WITH AUTOMATIC MULTIPLYING MEANS
Filed Aug. 4, 1932  4 Sheets-Sheet 1

INVENTOR:
August Kottmann
BY
ATTORNEY.

Sept. 25, 1934.    A. KOTTMANN    1,974,494
CALCULATING MACHINE WITH AUTOMATIC MULTIPLYING MEANS
Filed Aug. 4, 1932    4 Sheets-Sheet 4

INVENTOR:
August Kottmann
BY
ATTORNEY.

Patented Sept. 25, 1934

1,974,494

UNITED STATES PATENT OFFICE 1,974,494

CALCULATING MACHINE WITH AUTOMATIC MULTIPLYING MEANS

August Kottmann, Sommerda, Germany, assignor to Rheinische Metallwaaren- und Maschinenfabrik Sommerda Aktiengesellschaft, Sommerda, Germany, a corporation of Germany Application August 4, 1932, Serial No. 627,512
In Germany August 24, 1931

7 Claims. (Cl. 235—63)

The present invention relates to calculating machines having automatic multiplying means and concerns more particularly a device for automatically returning the register carriage of calculating machines of this kind.

In French Patent No. 721,550, a device for automatically returning the register carriage of a calculating machine having an automatic multiplying device is described in which the return of the carriage is prepared by the depression of the key by which, for effecting a multiplication, the main drive is connected, while, after completion of the calculation, the return of the carriage into the initial position is caused by the springing back of the key, so that then the motor automatically moves the carriage back into its initial position. The stopping of the drive for the return of the carriage is, in the machine according to the above mentioned patent, caused by a fixed stop on the register carriage, as soon as the carriage has reached the initial position.

The object of the invention is to provide a calculating machine as set forth in which the initial position of the register carriage may be altered by adjustable stops, which with regard to known machines of this kind has the advantage, that for certain calculations the carriage need not to be returned into an end position constant for all calculation species, but that a new initial position may, by the simple adjustment of a stop, be chosen depending upon the conditions prevailing.

In the accompanying drawings two embodiments of devices according to the invention are shown by way of example.

Figure 1:
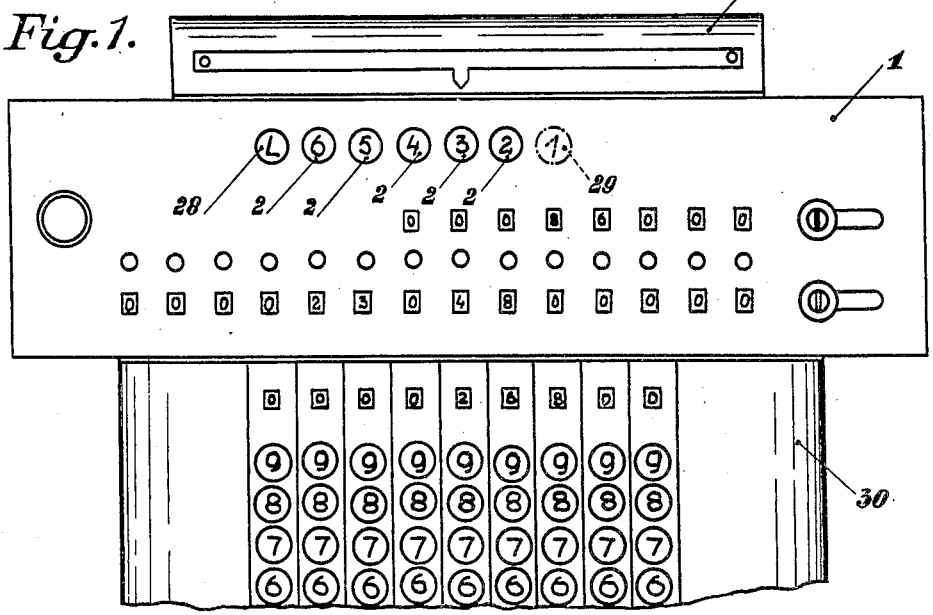
Fig. 1 is a plan view showing a part of a calculating machine according to the invention with a setting device for the adjustable stops consisting of several keys arranged upon the register carriage.

As in the machine described in French Patent No. 721,550, in the machine shown in the drawings a shifting element acting upon the clutch and upon the drive motor of the return means for the carriage is, by means of the multiplication key, brought into the path of motion of the reverse shifting element, as soon as the driving means of the machine is engaged. The reverse shifting element is moved by a frame which carries the multiplier-introducing elements. This frame is shifted out of the initial position upon introducing the multiplier, in accordance with the number of places thereof and upon computing the product is returned step by step into the initial position by the driving means of the machine. Shortly before this frame again reaches its initial position, the reverse shifting member carried by this frame acts upon the shifting element which has been brought into a position of readiness by the multiplication key, whereby the clutch and the drive motor for the carriage return means are connected into service.

The devices necessary for carrying out the operations explained so far are not shown, as they are described in detail in French Patent No. 721,550.

Figure 2:
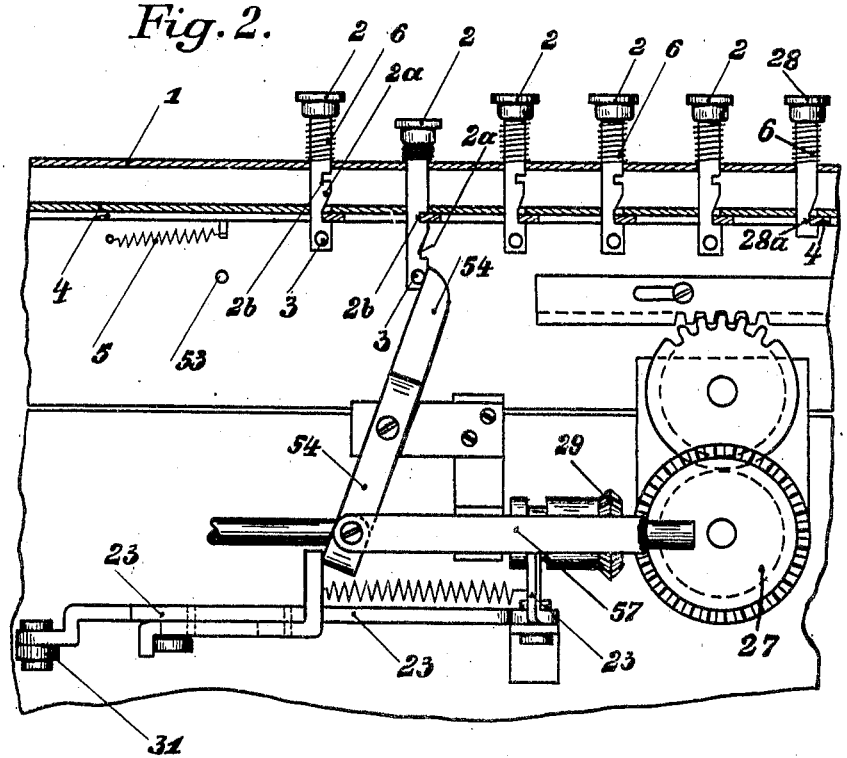
Fig. 2 is a rear view of the device for returning the carriage in connection with the adjustable stops.
Figure 3:
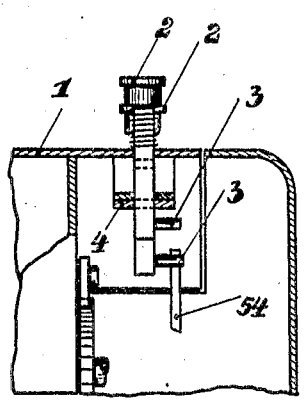
Fig. 3 is a side view of the corresponding key arrangement.
Figure 5:
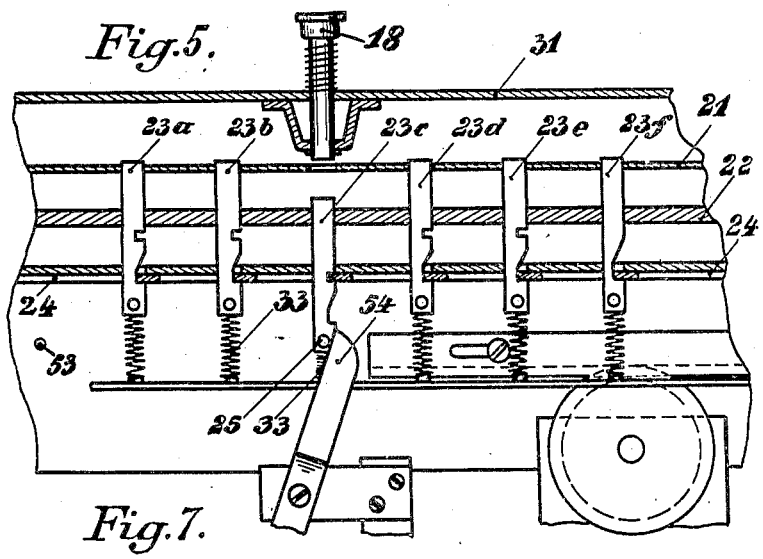
Fig. 5 is a rear view of the means for returning the carriage in connection with the setting device for the stops according to the embodiment shown in Fig. 4.
Figure 7:
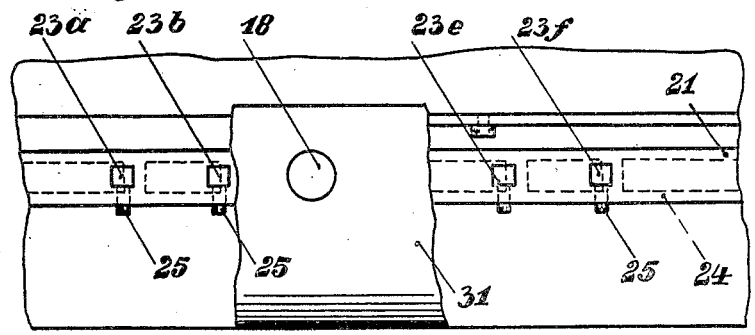
Fig. 7 is a plan view of the device shown in Fig. 5.
Figure 6:
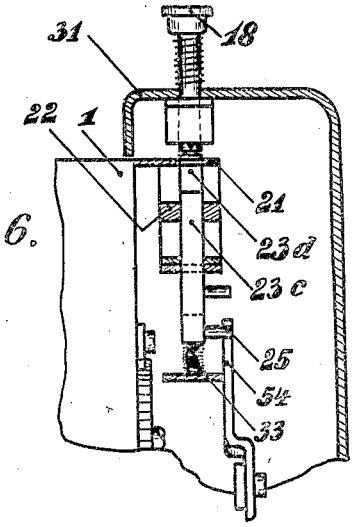
Fig. 6 is a side view showing a part of the device illustrated in Fig. 5.

According to the present invention a number of keys 2 are arranged upon the register carriage 1, as shown in Figs. 1 and 2. The shaft of each of these keys carries a stop pin or lug 3 and is provided with notches 2a and 2b. The notch 2a is sloped upwardly. If one of the keys 2 is depressed a bar or rail 4, engaging the notches 2a of all the keys 2, and which may be displaced in its longitudinal direction against the action of a spring 5, is moved to the right (Fig. 2) by means of the inclined or sloped face of this key. At the moment a key 2 is depressed far enough to bring the notch 2b to the level of the bar or rail 4, the latter springs into this notch and locks the key in the depressed position. One of the keys only may, at a time, be locked in the depressed position. If one of the keys 2 has already been depressed and the next key is depressed, the bar or rail 4 is moved to the right and thereby the edge of the bar already engaged in the notch 2b of the previously depressed key is withdrawn, so that this key will no longer be locked by the bar or rail 4. By means of a spring 6, surrounding the shaft of the key 2 and bearing against the under face of the key button the key is then pressed upwardly.

If none of the number keys 2 is depressed, the device acts in the manner described in above mentioned French Patent No. 721,550, that is to say, shortly before the register carriage reaches its initial position, the fixed stop 53 (Fig. 2) on the register carriage of the machine disengages the drive from the carriage by rotating the lever 54, moving the slide 57 to the left (Fig. 2), and thereby unmeshing the bevel gear 29 from the bevel gear 27. The driving motor of the return means of the carriage also is switched off by means of a shifting lever 23 and a bar 31 controlling the switch of the motor driving the machine, all as described in French Patent No. 721,550.

If, however, pressure is exerted upon the button of the key marked "3" (Figs. 1 and 2) and if then, after carrying out a multiplication, the register carriage is returned by the means provided for this purpose, the stop pin 3 of the depressed key abuts against the double armed lever 54 when the register carriage is still two steps short of reaching its initial position, and disengages the carriage return means. The register carriage is therefore not returned to its initial position, but into a position which lies two steps in front of the initial position. By depressing one of the keys 2 therefore, the position into which the carriage is returned may be altered.

If one of the adjustable stops has just been used and it is desired, for a new calculation, that the fixed stop 53 shall come to action, the key 28 marked "L" is depressed. In contradistinction to the keys 2 the shaft of the key 28 is provided with a notch 28a sloped upwardly only. By depressing the key 28 the locking bar or rail 4 is, by means of the inclined or sloped surface 28a, moved to the right so far, that the previously depressed stop key 2 may spring back, while the key 28 itself also is returned again under spring action into a position ready for operation as soon as the calculator raises his finger therefrom.

Figure 4:
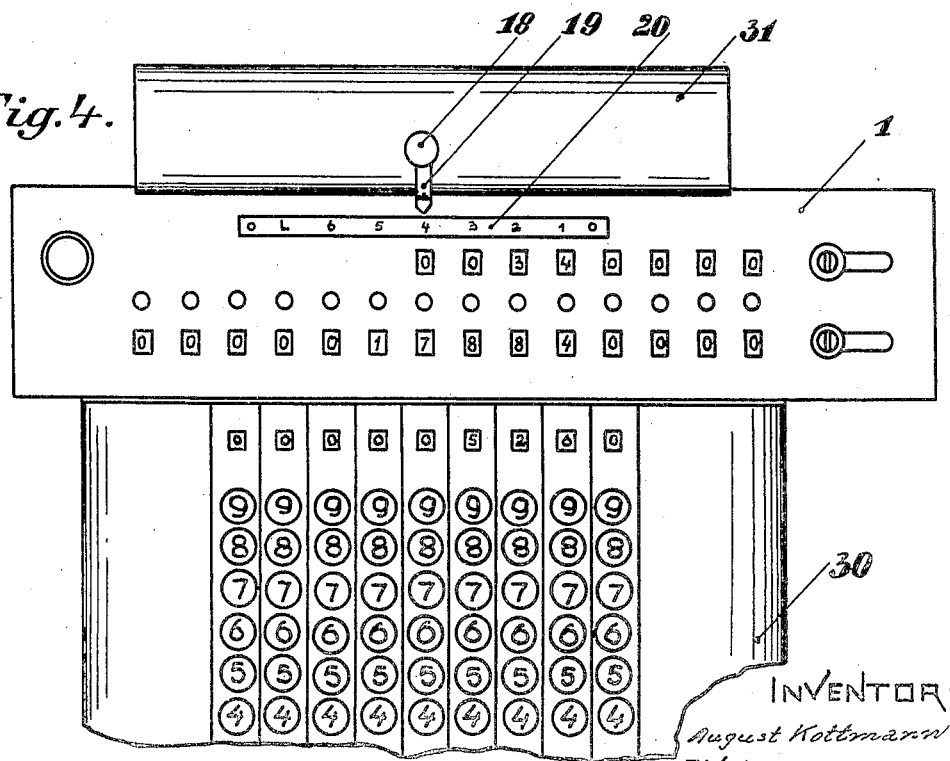
Fig. 4 is a plan view similar to Fig. 1 of a modified construction of the device according to the invention provided with a fixed key arrangement.

The construction of the device according to the second embodiment differs from that of the first described in this, that, instead of the six keys arranged upon the register carriage, a single key 18 is provided upon a protecting cover 31 (Figs. 4–7) fixed to the frame 30 of the machine. By means of this single key 18 the desired control of the several stops is effected. If, for instance, the register carriage is to be returned after each calculating operation into the position "4" shown in Fig. 4, the carriage is, before effecting the calculation, moved to the right until the pointer 19 fixed under the key 18 points to the number "4" of the bar 20, whereupon the key 18 is depressed. Hereby a setting pin 23c which is provided together with several further setting pins 23a–f in the frame 21, 22 of the carriage 1 and which corresponds to the position "4" is moved downwardly and locked by a bar or rail 24 in the depressed position. Upon the return of the carriage, a stop pin 25 provided on the setting pin 23c abuts against the double armed shifting lever 54 and causes the operations necessary for arresting the machine.

If for carrying out the next multiplication another position is desired to which, after effecting the calculation, the carriage is to be returned, the carriage is first brought into the desired position and then the stop is adjusted, whereupon the calculation may be carried out. If previously another stop was set, this latter, on account of the bar or rail 24 being displaced against the action of the spring during the new setting, returns to its initial position under the action of the corresponding pressure spring 33.

If, however, the carriage 1 is to be returned to the initial or end position indicated by the fixed stop 53 and marked by "L" upon the scale 20 (Fig. 4) which position is determined by the dimensions of the machine, the carriage is moved until the pointer 19 points to the "L" marked upon the scale or bar 20. Then the key 18 is depressed, so that the stop guiding pin, depressed at this time, may spring back into its initial position.

The device according to the invention may be used with advantage, when the sum of several products is to be divided by any value, that is to say, if a problem of the formula $$\frac{a_1.b_1 + a_2.b_2 + a_3.b_3 + \cdots + a_n.b_n}{c}$$

is to be calculated. For carrying out this calculation with the machine, first of all the multiplication is effected, without clearing the result register between the several multiplications. The single products are then added in the result register.

Figure 8:
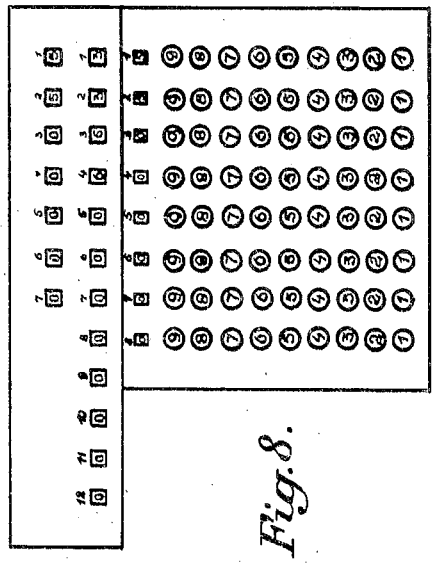

In the diagram shown in Fig. 8 which illustrates the machine not provided with a device for the invention the sum of several products has resulted to 6533.

Figure 9:
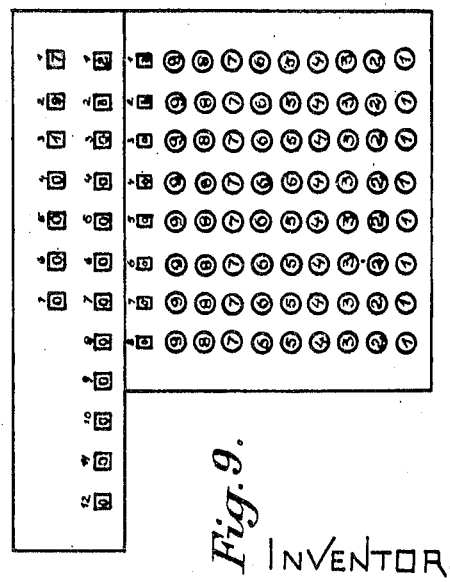

In the diagram shown in Fig. 9 the sum 6533 has been divided by 33. In the quotient register the quotient 197 has resulted and in the result register a remainder of 32 is left. The division cannot further be carried out, as the capacity of the quotient register is exhausted.

Figure 10:
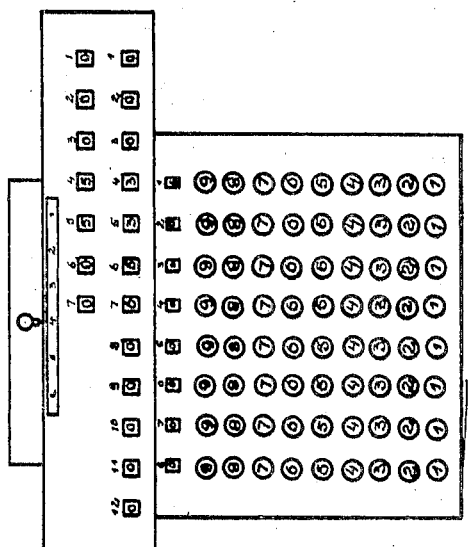
Figs. 8–11 are diagrammatic views.
Figure 11:
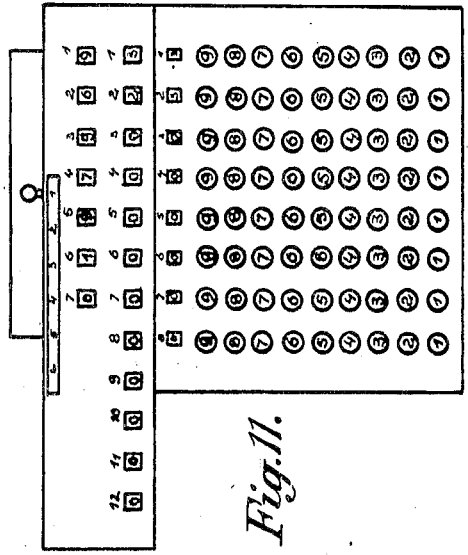

As will be seen from the diagrams Figs. 10 and 11, the quotient may more exactly be calculated by the machine according to the present invention.

Before the sum of the products resulting in the counting mechanism is exactly calculated by means of the machine according to the invention, a rough estimate is made how many places the product sum probably will have. Very often such a rough calculation will not be necessary, as in most offices the same calculations permanently are repeated, so that the calculator knows by experience, how many places the resulting sums will have at the most. In the diagrams shown in Figs. 10 and 11 the sum of the products is again supposed to be 6533 and this sum is again divided by 33.

In the example chosen according to Figs. 10 and 11 the quotient is calculated to the sixth place.

If the quotient is to be calculated to the Qth place and if the sum of the products has "S" places, and the divisor by which the sum of the products is to be divided has "D" places, the indication "B" of the key 2 to be depressed is found to be $B = Q + D - S$. In the present example is $Q = 6$, $D = 2$, $S = 4$. Therefore $B = 6 + 2 - 4 = 4$. The key 2 bearing upon its button the number "4" is therefore to be depressed.

If after the depression of this key the calculation is carried out, the quotient is calculated to the sixth place.

For calculations which are often to be carried out, the calculator usually knows by experience which of the keys 2 is to be depressed, so that the above explained rough estimate need not to be made.

The advantages of the mechanism according to this invention are particularly important when, in the aforementioned formula, the numerator tances from the fixed stop and each adapted to disconnect the power drive from the carriage before the latter reaches initial position in its return movement, a key common to all the movable stops for selectively setting any one of them into operative position, a bar common to all the movable stops for retaining a stop in operative position when the key is manipulated, said bar being movable by manipulation of any stop to release a previously manipulated stop, and means independent of the stops for moving the bar to its released position.

7. The arrangement in a calculating machine according to claim 1, in which the key mechanism comprises individual keys co-operating with respective movable stops for setting any one of them into operative position.

AUGUST KOTTMANN.

contains the sum of a very large number of products, say about fifty products. In the absence of the mechanism of this invention the register carriage for each multiplication would return into its initial position and the operator would then have to move the carriage to the right, for example, by four steps, after each of the fifty multiplications. This is very inconvenient and tiresome, and it requires in the first place great care because if the operator should forget to move the carriage by four steps in performing even a single one of the fifty multiplications the whole calculation would be incorrect.

All this is avoided by the mechanism of the present invention, in which it is merely necessary to depress the stop key 2 bearing the numeral 4 and then the carriage, after the calculation of each product, will be automatically separated from the drive in the position in which it still has four steps to move to bring it back to initial position. The carriage thus assumes the same position as if it had first been set in the initial position and shifted by the operator to the extent of four steps. This avoids any error due to inadvertent omission to shift the carriage from the initial position.

I claim as my invention:

1. In a calculating machine comprising a keyboard, a register carriage movable transversely relatively to the keyboard, means for moving the register carriage stepwise in one direction during performance of a calculation, and power driven mechanism for returning the carriage automatically to initial position on completion of a calculation, said mechanism including a stop fixed on the carriage and means operated by said stop for disconnecting the power drive from the carriage when it reaches said position; the arrangement of a series of normally inoperative movable stops on the carriage arranged at different distances from the fixed stop and each adapted to disconnect the power drive from the carriage before the latter reaches initial position in its return movement, and key mechanism co-operating with the several movable stops for setting any of them into operative position.

2. In a calculating machine comprising a keyboard, a register carriage movable transversely relatively to the keyboard, means for moving the register carriage stepwise in one direction during performance of a calculation, and power driven mechanism for returning the carriage automatically to initial position on completion of a calculation, said mechanism including a stop fixed on the carriage and means operated by said stop for disconnecting the power drive from the carriage when it reaches said position; the arrangement of a series of normally inoperative movable stops on the carriage arranged at different distances from the fixed stop and each adapted to disconnect the power drive from the carriage before the latter reaches initial position in its return movement, and a key common to all the movable stops for selectively setting any one of them into operative position.

3. In a calculating machine comprising a keyboard, a register carriage movable transversely relatively to the keyboard, means for moving the register carriage stepwise in one direction during performance of a calculation, and power driven mechanism for returning the carriage automatically to initial position on completion of a calculation, said mechanism including a stop fixed on the carriage and means operated by said stop for disconnecting the power drive from the carriage when it reaches said position; the arrangement of a series of normally inoperative movable stops on the carriage arranged at different distances from the fixed stop and each adapted to disconnect the power drive from the carriage before the latter reaches initial position in its return movement, keys associated with the several movable stops for setting any of them into operative position, and a bar common to all the movable stops for retaining a stop in operative position when its key is manipulated, said bar being movable by manipulation of any stop to release a previously manipulated stop.

4. In a calculating machine comprising a keyboard, a register carriage movable transversely relatively to the keyboard, means for moving the register carriage stepwise in one direction during performance of a calculation, and power driven mechanism for returning the carriage automatically to initial position on completion of a calculation, said mechanism including a stop fixed on the carriage and means operated by said stop for disconnecting the power drive from the carriage when it reaches said position; the arrangement of a series of normally inoperative movable stops on the carriage arranged at different distances from the fixed stop and each adapted to disconnect the power drive from the carriage before the latter reaches initial position in its return movement, a key common to all the movable stops for selectively setting any one of them into operative position, and a bar common to all the movable stops for retaining a stop in operative position when the key is manipulated, said bar being movable by manipulation of any stop to release a previously manipulated stop.

5. In a calculating machine comprising a keyboard, a register carriage movable transversely relatively to the keyboard, means for moving the register carriage stepwise in one direction during performance of a calculation, and power driven mechanism for returning the carriage automatically to initial position on completion of a calculation, said mechanism including a stop fixed on the carriage and means operated by said stop for disconnecting the power drive from the carriage when it reaches said position, the arrangement of a series of normally inoperative movable stops on the carriage arranged at different distances from the fixed stop and each adapted to disconnect the power drive from the carriage before the latter reaches initial position in its return movement, keys associated with the several movable stops for setting any of them into operative position, a bar common to all the movable stops for retaining a stop in operative position when its key is manipulated, said bar being movable by manipulation of any stop to release a previously manipulated stop, and means independent of the stops for moving the bar to its released position.

6. In a calculating machine comprising a keyboard, a register carriage movable transversely relatively to the keyboard, means for moving the register carriage stepwise in one direction during performance of a calculation, and power driven mechanism for returning the carriage automatically to initial position on completion of a calculation, said mechanism including a stop fixed on the carriage and means operated by said stop for disconnecting the power drive from the carriage when it reaches said position; the arrangement of a series of normally inoperative movable stops on the carriage arranged at different dis-